United States Patent
Hisano

(10) Patent No.: US 9,923,490 B2
(45) Date of Patent: Mar. 20, 2018

(54) VEHICLE

(71) Applicant: Toyota Jidosha Kabushiki Kaisha, Toyota-shi Aichi-ken (JP)

(72) Inventor: Taishi Hisano, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/602,498

(22) Filed: Jan. 22, 2015

(65) Prior Publication Data

US 2015/0222208 A1 Aug. 6, 2015

(30) Foreign Application Priority Data

Jan. 31, 2014 (JP) ................................ 2014-017104

(51) Int. Cl.
| | |
|---|---|
| *H02P 3/14* | (2006.01) |
| *B60L 7/14* | (2006.01) |
| *B60L 11/00* | (2006.01) |
| *B60L 11/12* | (2006.01) |
| *B60L 11/14* | (2006.01) |
| *B60L 15/20* | (2006.01) |

(52) U.S. Cl.
CPC .................. *H02P 3/14* (2013.01); *B60L 7/14* (2013.01); *B60L 11/005* (2013.01); *B60L 11/123* (2013.01); *B60L 11/14* (2013.01); *B60L 15/2009* (2013.01); *B60L 15/2045* (2013.01); *B60L 2210/14* (2013.01); *B60L 2210/40* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/445* (2013.01); *B60L 2250/26* (2013.01); *Y02T 10/6217* (2013.01); *Y02T 10/645* (2013.01); *Y02T 10/7022* (2013.01); *Y02T 10/7077* (2013.01); *Y02T 10/7225* (2013.01); *Y02T 10/7241* (2013.01); *Y02T 10/7283* (2013.01)

(58) Field of Classification Search
USPC ........ 318/376, 375, 362, 56, 57, 63, 400.09, 318/703, 741, 757, 759, 273; 701/70
See application file for complete search history.

(56) References Cited

U.S. PATENT DOCUMENTS

| | | | |
|---|---|---|---|
| 2010/0045224 A1* | 2/2010 | Suhama | ..................... B60L 7/14 318/434 |
| 2010/0076657 A1* | 3/2010 | Jinno | ..................... B60K 6/448 701/70 |
| 2012/0022735 A1 | 1/2012 | Tashiro et al. | |

(Continued)

FOREIGN PATENT DOCUMENTS

| | | |
|---|---|---|
| CN | 101573249 A | 11/2009 |
| CN | 103380041 A | 10/2013 |

(Continued)

*Primary Examiner* — Jorge L Carrasquillo
(74) *Attorney, Agent, or Firm* — Dinsmore & Shohl LLP

(57) ABSTRACT

An electric motor gives regenerative braking force to a hybrid vehicle by regenerative control. A regeneration level selector selects regenerative braking force of the electric motor by a driver's operation. When an ECO mode is applied, an ECU increases the regenerative braking force selected by the regeneration level selector as compared with the time when the ECO mode is not applied.

10 Claims, 6 Drawing Sheets

(56) References Cited

U.S. PATENT DOCUMENTS

| | | | |
|---|---|---|---|
| 2012/0123624 A1* | 5/2012 | Sato | B60L 7/14 701/22 |
| 2013/0162009 A1* | 6/2013 | Mitts | B60L 3/102 303/3 |
| 2014/0379190 A1* | 12/2014 | Sawada | B60T 1/10 701/22 |
| 2015/0006039 A1* | 1/2015 | Hyun | B60W 10/192 701/48 |
| 2015/0069938 A1* | 3/2015 | Hisano | B60L 7/14 318/377 |

FOREIGN PATENT DOCUMENTS

| | | |
|---|---|---|
| JP | H08-79907 A | 3/1996 |
| JP | 2000-175303 A | 6/2000 |
| JP | 2003-204602 A | 7/2003 |
| JP | 2006-151039 A | 6/2006 |
| JP | 2006-285731 A | 10/2006 |
| JP | 2012-018057 * | 1/2012 |
| JP | 2012-029461 A | 2/2012 |

* cited by examiner

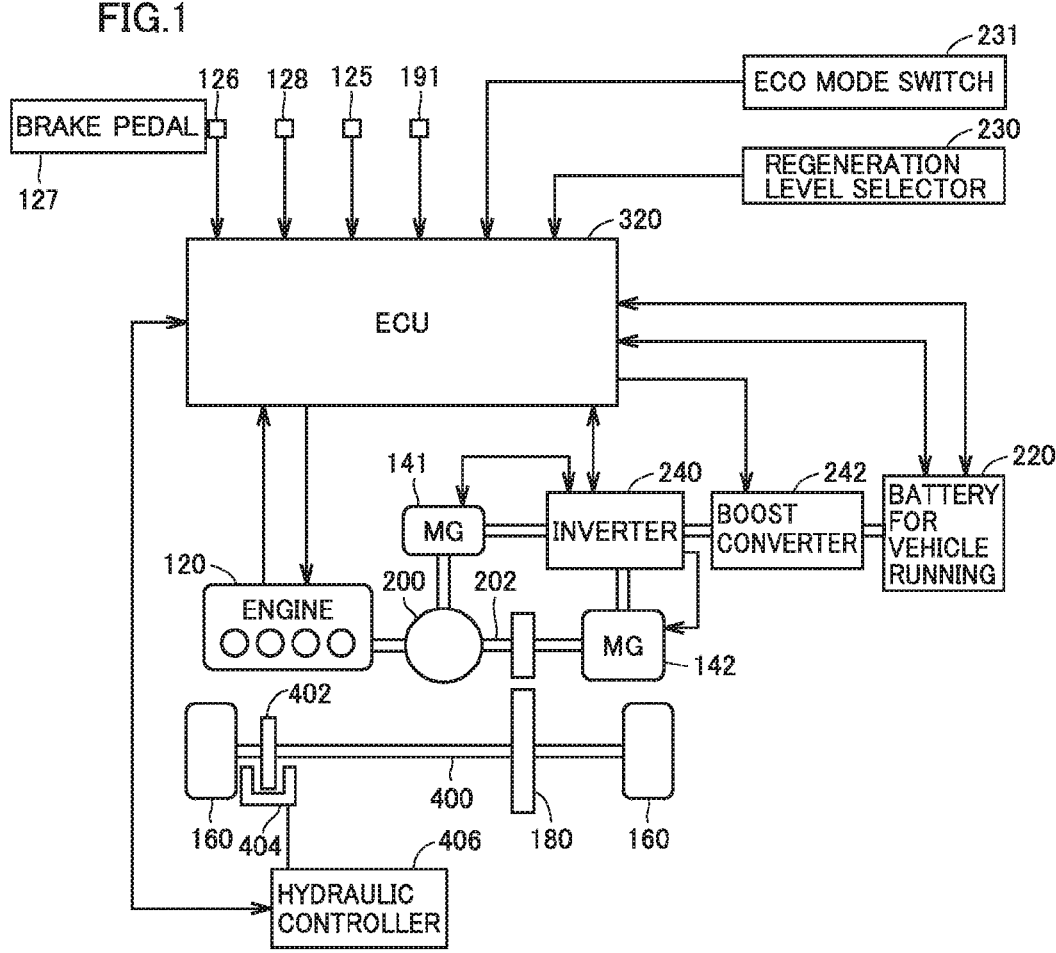

FIG.5

| REGENERATION LEVEL | REGENERATIVE REQUEST TORQUE | |
|---|---|---|
| | ECO MODE OFF | ECO MODE ON |
| B0 | TR0 (=0) | — |
| B1 | TR1 | — |
| B2(D RANGE) | TR2 | TR2 |
| B3 | TR3 | TR3 |
| B4 | TR4 | TR4 |
| B5 | TR5 | TR5 |

VEHICLE

This nonprovisional application is based on Japanese Patent Application No. 2014-017104 filed on Jan. 31, 2014, with the Japan Patent Office, the entire contents of which are hereby incorporated by reference.

BACKGROUND OF THE INVENTION

Field of the Invention

The present invention relates to a vehicle, and particularly to a vehicle having a function of variably setting regenerative braking force.

Description of the Background Art

Japanese Patent Laying-Open No. 08-079907 discloses a vehicle that is capable of changing regenerative braking force by a driver's operation.

SUMMARY OF THE INVENTION

According to Japanese Patent Laying-Open No. 08-079907, regenerative braking force can be changed by the driver's operation, but it does not take into account an ECO mode that can be selected by the driver. In other words, although the driver wishes to drive the vehicle with low fuel consumption by turning the ECO mode ON, the frequency that a hydraulic brake should be used does not decrease in the state where the regenerative braking force at the time when the ECO mode is ON is the same as that at the time when the ECO mode is OFF. Consequently, the vehicle may not be able to run with low fuel consumption.

Therefore, an object of the present invention is to provide a vehicle that is capable of changing regenerative braking force by a driver's operation, and that can be driven with low fuel consumption in the ECO mode.

A vehicle according to the present invention includes: an electric motor that gives regenerative braking force to the vehicle by regenerative control; a regeneration level selector that selects the regenerative braking force of the electric motor by a driver's operation; and a control device that increases the regenerative braking force selected by the regeneration level selector at a time when an ECO mode is applied as compared with a time when the ECO mode is not applied.

Accordingly, since the regenerative braking force is increased in the ECO mode, the frequency that a hydraulic brake should be used can be reduced, with the result that the vehicle can be driven with low fuel consumption.

Preferably, the regeneration level selector is capable of selecting one of a plurality of levels. In a case where a level less than a prescribed level is selected by the regeneration level selector, the control device increases the regenerative braking force for the same level at a time when the ECO mode is applied as compared with a time when the ECO mode is not applied.

Accordingly, in the case where a relatively lower regeneration level is selected by the regeneration level selector, the regenerative braking force is increased at the time when the ECO mode is applied, thereby reducing the frequency that the hydraulic brake should be used, with the result that the vehicle can be driven with low fuel consumption.

Preferably, the regeneration level selector is capable of selecting one of a plurality of levels. When the ECO mode is applied, the control device inhibits the regeneration level selector from selecting a level less than a prescribed level.

Accordingly, when the ECO mode is applied, relatively small regenerative braking force cannot be selected by the regeneration level selector. Therefore, the driver causes the regeneration level selector to select a relatively high regeneration level. Consequently, when the ECO mode is applied, the regenerative braking force is increased, thereby reducing the frequency that the hydraulic brake should be used, with the result that the vehicle can be driven with low fuel consumption.

Preferably, the regeneration level selector is capable of selecting one of a plurality of levels. In a case where a level equal to or higher than a prescribed level is selected by the regeneration level selector, the control device sets the regenerative braking force for the same level to be identical at both of a time when the ECO mode is applied and a time when the ECO mode is not applied.

When the regeneration level is equal to or higher than the prescribed level, the regenerative braking force is relative large, so that the vehicle can be driven with low fuel consumption. Accordingly, the regenerative braking force is set to be identical at both of the time when the ECO mode is applied and the time when the ECO mode is not applied, with the result that the regenerative braking force can be prevented from needlessly increasing in the ECO mode.

Preferably, when the ECO mode is applied and when a speed of the vehicle is equal to or higher than a first prescribed value, the control device decreases the regenerative braking force as the speed increases.

When the speed of the vehicle is relatively high, the driver is more likely to feel abrupt deceleration by regenerative braking as the speed increases. However, the above-described configuration is employed to decrease the regenerative braking force as the speed increases, so that it becomes possible to prevent the driver from feeling abrupt deceleration.

Preferably, when the ECO mode is applied and when a speed of the vehicle is equal to or less than a second prescribed value, the control device decreases the regenerative braking force as the speed decreases.

Accordingly, when the speed of the vehicle is relatively low, the driver is more likely to feel abrupt deceleration by regenerative braking as the speed decreases. However, the above-described configuration is employed to decrease the regenerative braking force as the speed decreases, so that it becomes possible to prevent the driver from feeling abrupt deceleration.

According to the present invention, regenerative braking force can be changed by the driver's operation, and the vehicle can be driven with low fuel consumption in the ECO mode.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a control block diagram of a hybrid vehicle according to an embodiment of the present invention.

FIG. 2 is a diagram showing regenerative request torques for the regeneration level selected by a regeneration level selector 230 at the time when an ECO mode is OFF and the time when the ECO mode is ON, according to the first embodiment.

FIG. 5 is a diagram showing regenerative request torques for the regeneration level selected by a regeneration level selector 230 at the time when the ECO mode is OFF and the time when the ECO mode is ON, according to the second embodiment.

DESCRIPTION OF THE PREFERRED EMBODIMENTS

Figure 3:
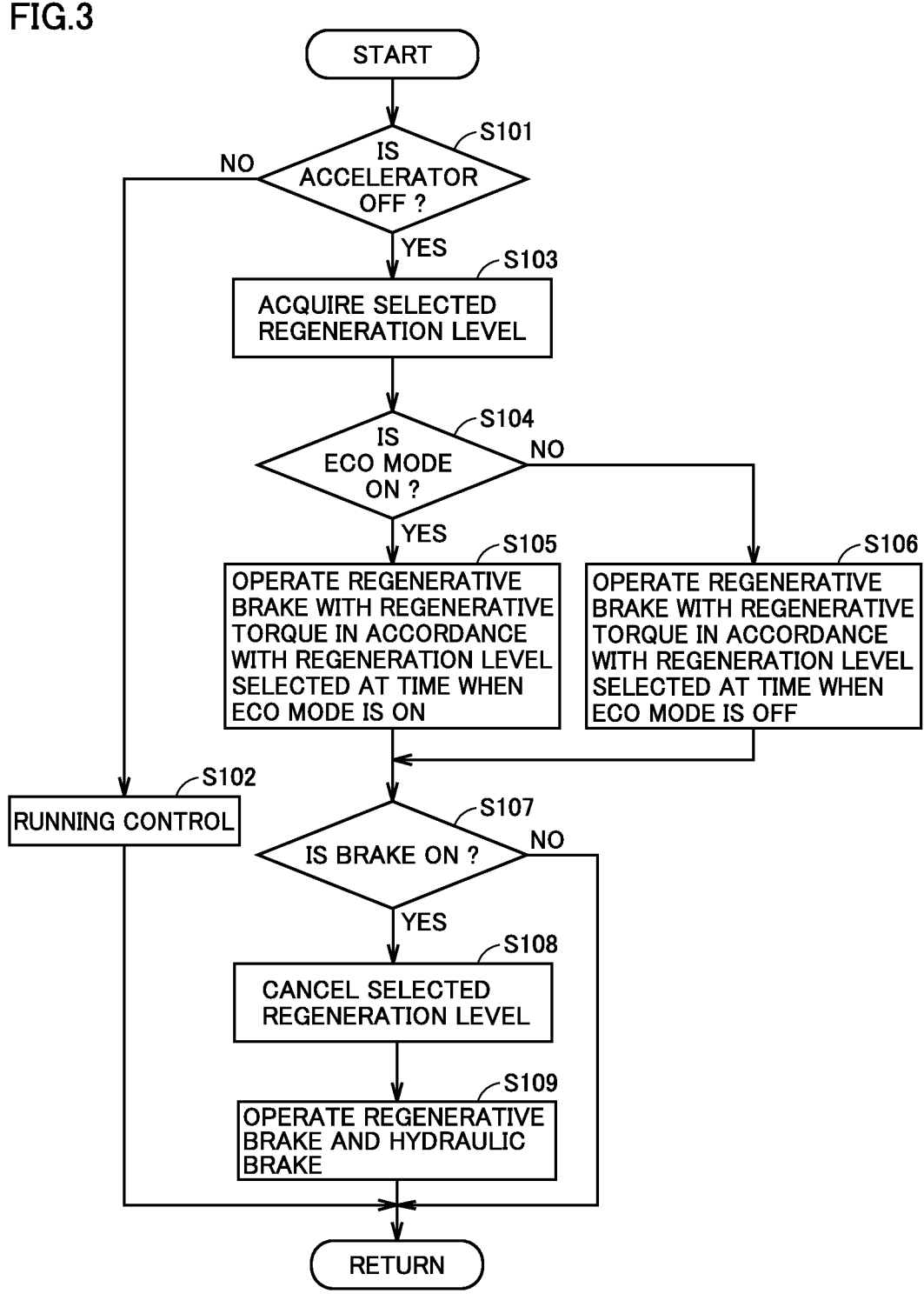
FIG. 3 is a flowchart showing the procedure of regenerative control according to the first embodiment.

The embodiments of the present invention will be hereinafter described with reference to the accompanying drawings. In the following description, the same components are designated by the same reference characters. Names and functions thereof are also the same. Therefore, detailed description thereof will not be repeated.

[First Embodiment]

Referring to FIG. 1, a control block diagram of a hybrid vehicle according to an embodiment of the present invention will be hereinafter described. It is to be noted that the present invention is not limited to a hybrid vehicle shown in FIG. 1, but may be a hybrid vehicle having a different configuration equipped with a secondary battery. Furthermore, not a secondary battery but a power storage mechanism such as a capacitor may be employed. Also, in the case where a secondary battery is employed, it may be a nickel-metal hydride battery, a lithium ion battery or the like, but the type thereof is not particularly limited.

The hybrid vehicle includes: an internal combustion engine (which will be hereinafter simply referred to as an engine) 120 as a driving source, for example, a gasoline engine, a diesel engine and the like; a first MG (Motor Generator) 141; and a second MG 142.

In addition to the above, the hybrid vehicle includes: a reduction gear 180 that transmits motive power generated in engine 120 and second MG 142 to a driving wheel 160, and transmits driving force from driving wheel 160 to engine 120 and second MG 142; an output shaft 202; a power split device (for example, a planetary gear mechanism) 200 that distributes the motive power generated by engine 120 to two paths including a path leading to driving wheel 160 and a path leading to first MG 141; a battery 220 that is charged with electric power for driving second MG 142; and an inverter 240 that performs current control while performing conversion between a direct current of battery 220 and an alternating current of each of second MG 142 and first MG 141.

According to the present embodiment, a boost converter 242 is provided between battery 220 and inverter 240. This is because, since the rated voltage of battery 220 is lower than the rated voltage of second MG 142 or first MG 141, electric power is boosted by boost converter 242 when battery 220 supplies electric power to second MG 142 or first MG 141.

The hybrid vehicle further includes: a brake disc 402 that is provided in a drive shaft 400 connected to driving wheel 160, a brake mechanism 404, and a hydraulic controller 406. Brake mechanism 404 receives brake hydraulic pressure from hydraulic controller 406, sandwiches brake disc 402 in accordance with the received brake hydraulic pressure, and produces frictional braking force to decelerate the vehicle. Hydraulic controller 406 receives a brake control signal from ECU 320, calculates brake hydraulic pressure for producing frictional braking force (hydraulic brake) indicated by the brake control signal, and outputs the calculated brake hydraulic pressure to brake mechanism 404.

Furthermore, the hybrid vehicle includes an electronic control unit (ECU) 320 controlling the operation state of engine 120, controlling first MG 141, second MG 142, battery 220, inverter 240, and the like in accordance with the state of the hybrid vehicle, and controlling the entire hybrid system such that the hybrid vehicle can be operated most efficiently.

In power split device 200, a planetary gear mechanism (a planetary gear) is used for dividing the motive power of engine 120 between driving wheel 160 and first MG 141.

The hybrid vehicle provided with a hybrid system as shown in FIG. 1 is driven only by power running control of second MG 142 when the efficiency of engine 120 is relatively low, for example, at the start of the vehicle, during low speed running of the vehicle, or the like.

During normal running of the vehicle, for example, the motive power of engine 120 is split into two paths by power split device 200. One of the paths serves to directly drive driving wheel 160 while the other of the paths serves to drive first MG 141 to generate electric power. At this time, the generated electric power is used to control power running of second MG 142 to assist in driving of driving wheel 160.

Furthermore, during high speed running of the vehicle, the electric power from battery 220 is further supplied to second MG 142 to increase the output of second MG 142, thereby adding driving force to driving wheel 160.

On the other hand, during deceleration, second MG 142 driven by driving wheel 160 is regeneratively controlled in accordance with the regenerative request torque, and caused to function as a generator to perform regenerative power generation. Then, the recovered electric power is stored in battery 220.

In addition, when the charged amount of battery 220 decreases and therefore battery 220 particularly needs to be charged, engine 120 is started or the output of engine 120 is increased, so that the charged amount of battery 220 is increased by power generation by first MG 141 (forced charging). As a matter of course, control for increasing the driving amount of engine 120 is performed as required also during low speed running For example, there may be cases where battery 220 needs to be charged as described above, where auxiliary machinery such as an air conditioner is driven, where the temperature of cooling water of engine 120 is raised to a prescribed temperature, and the like.

A speed sensor 128 detects a speed V of the vehicle (vehicle speed). A brake sensor 126 detects depression of a brake pedal 127. It is appreciated that the brake pedal 127 is operated, for example depressed, by a first driver's operation. An accelerator sensor 125 detects an accelerator pedal position Acc. When an ECO mode switch 231 is turned ON, the ECO mode is set to be ON. When ECO mode switch 231 is turned OFF, the ECO mode is set to be OFF. It is appreciated that the ECO mode switch 231 is switched between ON and OFF to select the ECO mode by a third driver's operation.

In this case, the ECO mode means a low fuel consumption running mode that is, for example, a mode in which driving force is generated relatively gently with respect to the accelerator operation amount.

Regeneration level selector 230 selects a regeneration level in accordance with the paddle operation by the user. It is appreciated that the regeneration level selector 230 selects the regeneration level by a second driver's operation, for example the paddle operation by the user. In the embodiment of the present invention, the regeneration level is defined to have six stages including B0 to B5, for example.

FIG. 2 is a diagram showing regenerative request torques for the regeneration level selected by regeneration level selector 230 at the time when the ECO mode is OFF and the time when the ECO mode is ON, according to the first embodiment.

A regeneration level B2 is a normal (default) level, and a regenerative request torque TR2 is a normal (default) regenerative request torque. When a D range (moving forward) is selected by a select bar 191 and a regeneration level is not selected by regeneration level selector 230, the regeneration level is maintained at a normal (default) regeneration level B2.

In the case where regeneration levels B0, B1, B2, B3, B4, and B5 are selected by regeneration level selector 230, regenerative control is performed at regenerative request torques TR0, TR1, TR2, TR3, TR4, and TR5, respectively, at the time when the ECO mode is OFF.

In this case, TR0<TR1<TR2<TR3<TR4<TR5. TR0 is "0".

In the case where regeneration levels B0, B1, B2, B3, B4, and B5 are selected by regeneration level selector 230, regenerative control is performed at regenerative request torques ETR0, ETR1, TR2, TR3, TR4, and TR5, respectively, at the time when the ECO mode is ON. In this case, ETR0<ETR1<TR2<TR3<TR4<TR5. Also, ETR0>TR0 and ETR1>TR1.

ECU 320 gives a drive command to inverter 240 in accordance with the regenerative request torque corresponding to the selected regeneration level. Second MG 142 is driven by inverter 240 to generate electric power, and battery 220 is charged with the obtained electric power. Braking force is generated by the resistance force of second MG 142 produced during this power generation. This braking force is used as regenerative braking force. The smaller the regenerative request torque is, the smaller the driving force of second MG 142 becomes, so that the regenerative braking force becomes smaller.

In the case where regeneration levels B0 and B1 are selected, the regenerative torque and the regenerative braking force each are increased when the ECO mode is applied. Accordingly, the frequency that a hydraulic brake should be used is reduced, with the result that the vehicle can be driven with low fuel consumption.

As shown in FIG. 2, in the case where the regeneration level is B2 to B5, regenerative control is performed using the same regenerative request torque at both of the time when the ECO mode is ON and the time when the ECO mode is OFF. This is because regenerative braking force is relatively large at the regeneration levels of B2 to B5 so that the vehicle can be driven with low fuel consumption, and therefore, the regenerative braking force can be prevented from needlessly increasing in the ECO mode by applying the same regenerative braking force at both of the time when the ECO mode is applied and the time when the ECO mode is not applied.

When the regenerative request torque is increased, the regenerative braking force is increased, with the result that the deceleration of the hybrid vehicle is increased.

While the driver is depressing a brake pedal, ECU 320 causes a hydraulic brake to operate together with a regenerative brake so as to generate braking force in accordance with the depressed amount of the brake pedal.

FIG. 3 is a flowchart showing the procedure of regenerative control according to the first embodiment.

In step S101, when the driver operates to depress an accelerator pedal (an accelerator is ON), the process proceeds to step S102; and when the driver does not operate to depress the accelerator pedal (the accelerator is OFF), the process proceeds to step S103.

In step S102, ECU 320 performs normal control of engine 120, second MG 142, and first MG 141 in accordance with the vehicle requiring power.

In step S103, ECU 320 acquires the regeneration level selected based on the current states of select bar 191 and regeneration level selector 230.

In step S104, when the ECO mode is set to be ON by ECO mode switch 231, the process proceeds to step S105; and when the ECO mode is not set to be ON by ECO mode switch 231, the process proceeds to step S106.

In step S105, ECU 320 performs regenerative control of second MG 142 with the regenerative request torque in accordance with the regeneration level selected at the time when the ECO mode is ON as shown in FIG. 2, thereby causing the regenerative brake to operate.

In step S106, ECU 320 performs regenerative control of second MG 142 with the regenerative request torque in accordance with the regeneration level selected at the time when the ECO mode is OFF, thereby causing the regenerative brake to operate.

In step S107, when the driver operates to depress a brake pedal (the brake is ON), the process proceeds to step S108; and when the driver does not operate to depress the brake pedal (that is, the brake is OFF), the process is completed.

In step S108, ECU 320 cancels the selected regeneration level.

In step S109, ECU 320 performs regenerative control of second MG 142 so as to generate braking force in accordance with the depressed amount of the brake pedal while the driver is depressing the brake pedal, thereby causing the regenerative brake to operate as much as possible and also causing the hydraulic brake to operate for making up for shortages.

(Operation Example)

Then, the operation example of the first embodiment will be hereinafter described.

Figure 4:
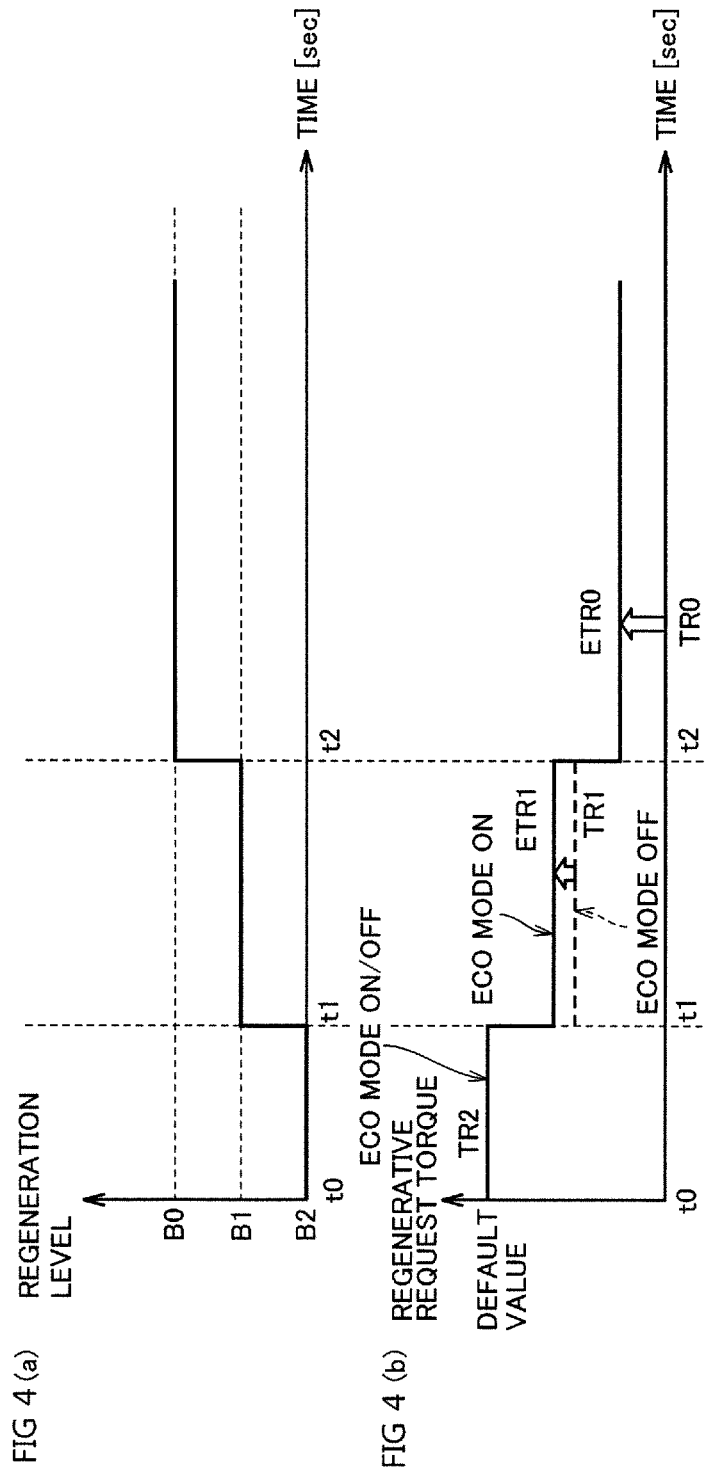
FIG. 4(a) is a diagram showing a regeneration level.
FIG. 4(b) is a diagram showing a regenerative request torque at each of the time where the ECO mode is ON and the time when the ECO mode is OFF.

FIG. 4(a) shows a regeneration level and FIG. 4(b) shows a regenerative request torque at each of the time when the ECO mode is ON and the time when the ECO mode is OFF.

In time t0 to time t1, the regeneration level is set at B2 that is a default. In this time period, the regenerative request torque becomes TR2 (a default value) at both of the time when the ECO mode is ON and the time when the ECO mode is OFF.

In time t1 to time t2, the regeneration level is set at B1. In this time period, the regenerative request torque becomes TR1 at the time when the ECO mode is OFF. At the time when the ECO mode is ON, the regenerative request torque becomes ETR1 that is greater than TR1.

At and after time t2, the regeneration level is set at B0. In this time period, the regenerative request torque becomes TR0 (=0) at the time when the ECO mode is OFF; and the regenerative request torque becomes ETR0 that is greater than TR0 at the time when the ECO mode is ON.

As described above, according to the present embodiment, in the case where the regeneration level smaller than a default level (B2) is selected by the regeneration level selector, the regenerative braking force is increased more at the time when the ECO mode is ON than at the time when the ECO mode is OFF. Accordingly, the frequency that the hydraulic brake should be used can be reduced in the ECO mode, so that the vehicle can be driven with low fuel consumption.

In the present embodiment, in the case where the regeneration level is B2 to B5, the regenerative request torque is set to be the same (therefore, the regenerative braking force is the same) at both of the time when the ECO mode is ON and the time when the ECO mode is OFF, but the present invention is not limited thereto.

Even in the case where the regeneration level is B2 to B5, the regenerative request torque at the same level may be increased (therefore, the regenerative braking force may be increased) more at the time when the ECO mode is ON than at the time when the ECO mode is OFF.

[Second Embodiment]

FIG. 5 is a diagram showing regenerative request torques for the regeneration level selected by regeneration level selector 230 at the time when the ECO mode is OFF and at the time when the ECO mode is ON, according to the second embodiment.

In the case where regeneration levels B0, B1, B2, B3, B4, and B5 are selected by regeneration level selector 230, regenerative control is performed at regenerative request torques TR0, TR1, TR2, TR3, TR4, and TR5, respectively, at the time when the accelerator is OFF while the ECO mode is OFF. In this case, TR0<TR1<TR2<TR3<TR4<TR5. TR0 is "0".

In the case where regeneration levels B2, B3, B4, and B5 are selected by regeneration level selector 230, regenerative control is performed at regenerative request torques TR2, TR3, TR4, and TR5, respectively, at the time when the accelerator is OFF while the ECO mode is ON.

In the ECO mode, ECU 320 performs control such that regeneration levels B0 and B1 cannot be selected by regeneration level selector 230. Thereby, even if the driver performs a paddle operation of regeneration level selector 230, the driver cannot set the regeneration level at B0 or B1. When the ECO mode is switched ON while the regeneration level is set at B0 or B1 in the state where the ECO mode is OFF, the regeneration level is set at B2.

Figure 6:
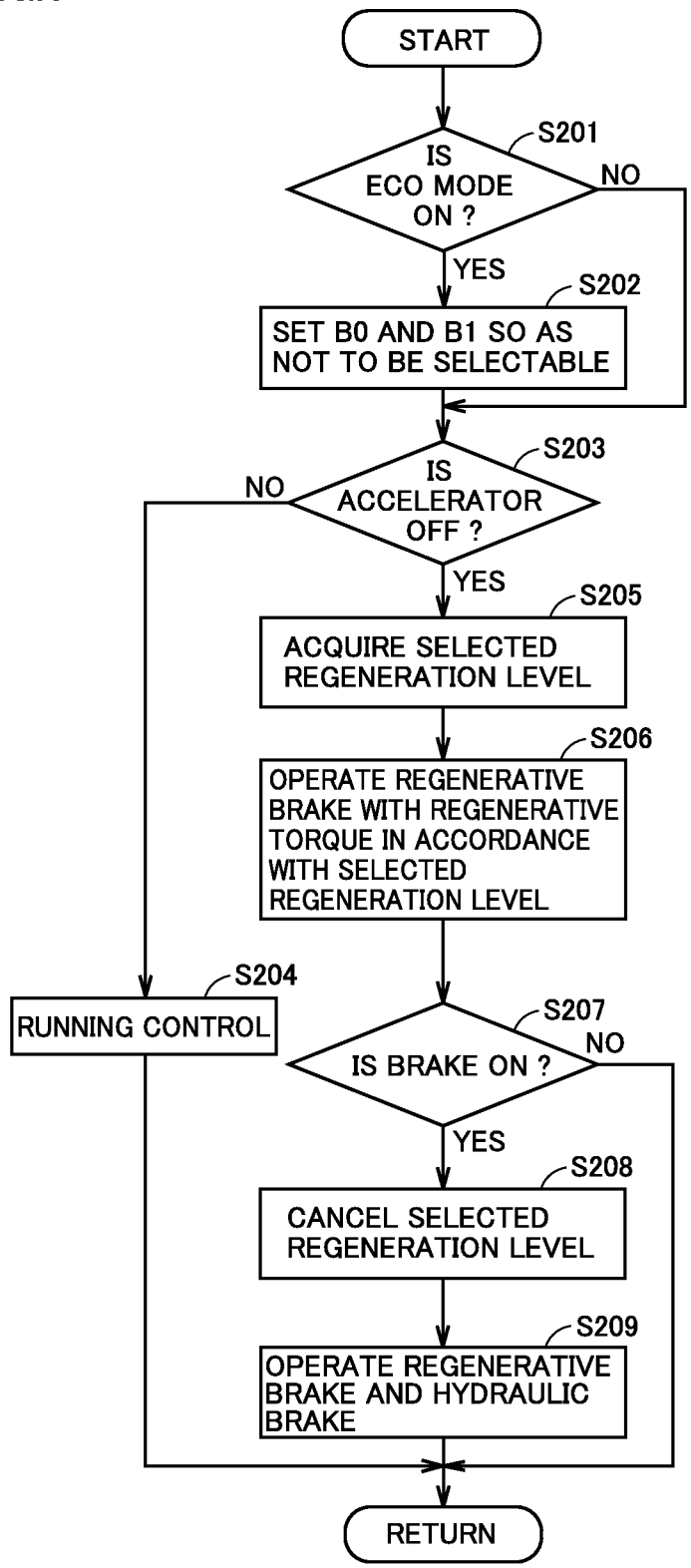
FIG. 6 is a flowchart showing the procedure of regenerative control according to the second embodiment.

FIG. 6 is a flowchart showing the procedure of regenerative control according to the second embodiment.

In step S201, when the ECO mode is set to be ON by ECO mode switch 231, the process proceeds to step S202; and when the ECO mode is not set to be ON by ECO mode switch 231, the process proceeds to step S203.

In step S202, ECU 320 performs control such that regeneration levels B0 and B1 cannot be selected by regeneration level selector 230.

In step S203, when the driver operates to depress an accelerator pedal (an accelerator is ON), the process proceeds to step S204; and when the driver does not operate to depress the accelerator pedal (the accelerator is OFF), the process proceeds to step S205.

In step S204, ECU 320 performs normal control of engine 120, second MG 142, and first MG 141 in accordance with the vehicle requiring power.

In step S205, ECU 320 acquires the regeneration level selected based on the current states of select bar 191 and regeneration level selector 230.

In step S206, ECU 320 performs regenerative control of second MG 142 with the regenerative request torque in accordance with the selected regeneration level, thereby causing the regenerative brake to operate.

In step S207, when the driver operates to depress the brake pedal (a break is ON), the process proceeds to step S208; and when the driver does not operate to depress the brake pedal (that is, the brake is OFF), the process is completed.

In step S208, ECU 320 cancels the selected regeneration level.

In step S209, ECU 320 performs regenerative control of second MG 142 such that braking force in accordance with the depressed amount of the brake pedal is generated while the driver is depressing the brake pedal, thereby causing the regenerative brake to operate as much as possible and also causing the hydraulic brake to operate for making up for shortages.

As described above, according to the present embodiment, by preventing the regeneration level selector from selecting the regeneration level smaller than a default level (B2) at the time when the ECO mode is ON, the driver causes the regeneration level selector to select a relatively higher regeneration level. Consequently, regenerative braking force is increased when the ECO mode is applied. Accordingly, the frequency that a hydraulic brake should be used is decreased, thereby allowing the vehicle to be driven with low fuel consumption.

[Third Embodiment]

In the present embodiment, the regenerative request torque is changed by the speed of the hybrid vehicle.

Figure 7:
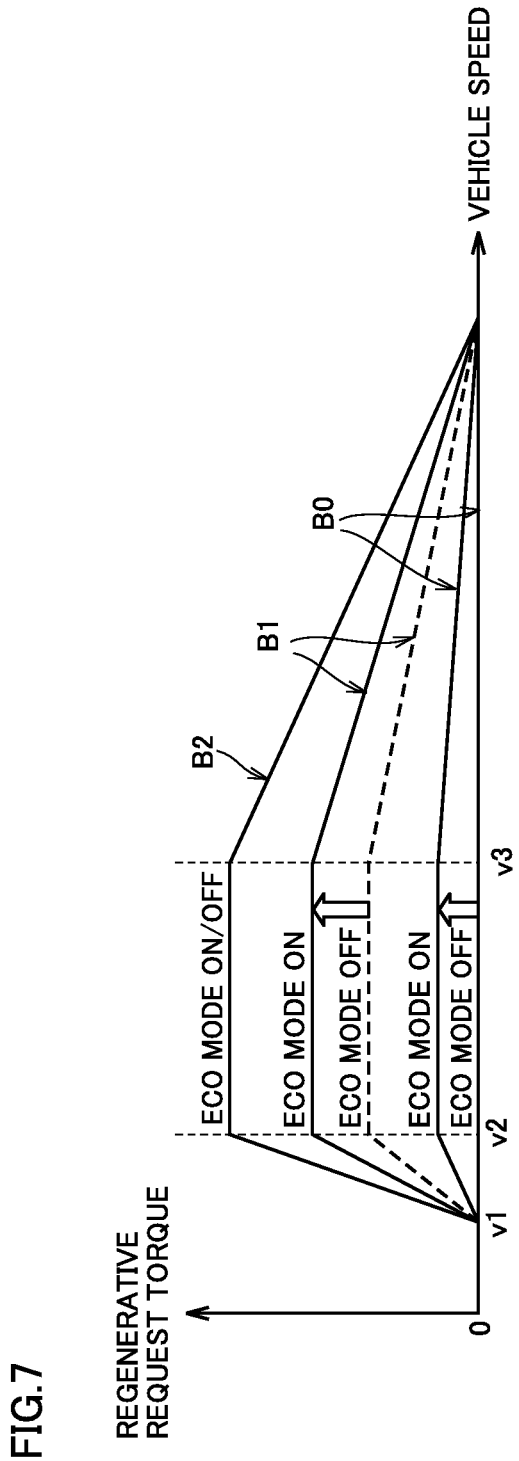
FIG. 7 is a diagram showing a regenerative request torque with respect to the speed and the regeneration level of a hybrid vehicle according to the third embodiment.

FIG. 7 is a diagram showing a regenerative request torque with respect to the speed and the regeneration level of a hybrid vehicle according to the third embodiment.

In a high speed region of a first prescribed speed v3 (50 km/h) or higher, the driver is more likely to feel abrupt deceleration when the deceleration is increased. Accordingly, ECU 320 decreases the regenerative request torque as the speed increases, thereby decreasing the regenerative braking force.

In a low speed region of a second prescribed speed v2 (10 km/h) or lower, the impact given to the driver is increased when the deceleration is increased, so that the driver is more likely to feel abrupt deceleration. Therefore, at the second prescribed speed or lower, ECU 320 decreases the regenerative request torque as the speed decreases, thereby decreasing the regenerative braking force.

When the regeneration level is B2, the regenerative request torques at the time when the ECO mode is ON and the time when the ECO mode is OFF are the same. In a low speed region of a prescribed speed v1 or higher and second prescribed speed v2 or lower, the regenerative request torque is increased as the speed of the hybrid vehicle increases. In a region of higher than second prescribed speed v2 and lower than a first prescribed speed v3, the regenerative request torque shows a constant value. In a high speed region of first prescribed speed v3 or higher, the regenerative request torque is decreased as the speed of the hybrid vehicle increases.

When the regeneration level is B1, the regenerative request torque at the time when the ECO mode is ON is greater than the regenerative request torque at the time when the ECO mode is OFF. In a low speed region of prescribed speed v1 or higher and second prescribed speed v2 or lower, the regenerative request torque is increased as the speed of the hybrid vehicle increases at both of the time when the ECO mode is ON and the time when the ECO mode is OFF. In a region of higher than second prescribed speed v2 and lower than first prescribed speed v3, the regenerative request torque shows a constant value at both of the time when the ECO mode is ON and the time when the ECO mode is OFF. In a high speed region of first prescribed speed v3 or higher, the regenerative request torque is decreased as the speed of the hybrid vehicle increases at both of the time when the ECO mode is ON and the time when the ECO mode is OFF.

When the regeneration level is B0, the regenerative request torque at the time when the ECO mode is ON is greater than the regenerative request torque at the time when the ECO mode is OFF. The regenerative request torque at the time when the ECO mode is OFF is 0. In a low speed region of prescribed speed v1 or higher and second prescribed speed v2 or lower, the regenerative request torque is increased as the speed of the hybrid vehicle increases at the time when the ECO mode is ON. In a region of higher than second prescribed speed v2 and lower than first prescribed speed v3, the regenerative request torque shows a constant value at both of the time when the ECO mode is ON and the time when the ECO mode is OFF. In a high speed region of first prescribed speed v3 or higher, the regenerative request torque is decreased as the speed of the hybrid vehicle increases at the time when the ECO mode is ON.

When a hybrid vehicle runs at relatively high speed, the driver is more likely to feel abrupt deceleration by regenerative braking as the speed increases. According to the present embodiment, in a high speed region of the first prescribed speed (50 km/h) or higher, the regenerative request torque is decreased as the speed increases, thereby reducing the regenerative braking force, so that it becomes possible to prevent the driver from feeling abrupt deceleration.

Furthermore, when the hybrid vehicle runs at relatively low speed, the driver is more likely to feel abrupt deceleration by regenerative braking as the speed decreases. According to the present embodiment, in a low speed region of second prescribed speed (10 km/h) or lower, the regenerative request torque is decreased as the speed decreases, thereby reducing the regenerative braking force, so that it becomes possible to prevent the driver from feeling abrupt deceleration.

According to the present embodiment, the regenerative request torque is changed in accordance with the speed of the hybrid vehicle at the regeneration levels of B1 and B2 even at the time when the ECO mode is OFF, but the present invention is not limited thereto. The regenerative request torque may not be changed in accordance with the speed of the hybrid vehicle at the time when the ECO mode is OFF.

Although a hybrid vehicle has been described as an example of a vehicle in the above-described embodiments, the present invention is not limited thereto, but the vehicle of the present invention may be an electric vehicle.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A vehicle comprising:
a brake pedal operated by a first driver's operation applied to the brake pedal;
an electric motor that gives regenerative braking force to said vehicle by regenerative control;
a regeneration level selector that selects the regenerative braking force of said electric motor by a second driver's operation applied to the regeneration level selector, said regeneration level selector is configured to select one of a plurality of levels;
an ECO switch that selects an ECO mode by a third driver's operation; and
an electronic control unit that increases said regenerative braking force selected by said regeneration level selector at a time when the ECO mode is applied as compared with a time when the ECO mode is not applied.

2. The vehicle according to claim 1, wherein
in a case where a level less than a prescribed level is selected by said regeneration level selector, said electronic control unit increases said regenerative braking force for the same level at a time when the ECO mode is applied as compared with a time when the ECO mode is not applied.

3. The vehicle according to claim 1, wherein
when the ECO mode is applied, said electronic control unit inhibits said regeneration level selector from selecting a level less than a prescribed level.

4. The vehicle according to claim 1, wherein
in a case where a level equal to or higher than a prescribed level is selected by said regeneration level selector, said electronic control unit sets said regenerative braking force for the same level to be identical at both of a time when the ECO mode is applied and a time when the ECO mode is not applied.

5. The vehicle according to claim 1, wherein, when said ECO mode is applied and when a speed of said vehicle is equal to or higher than a first prescribed value, said electronic control unit decreases said regenerative braking force as said speed increases.

6. The vehicle according to claim 1, wherein, when said ECO mode is applied and when a speed of said vehicle is equal to or less than a second prescribed value, said electronic control unit decreases said regenerative braking force as said speed decreases.

7. A vehicle comprising:
a brake pedal operated by a first driver's operation applied to the brake pedal;
an electric motor that gives regenerative braking force to said vehicle by regenerative control;
a regeneration level selector that selects the regenerative braking force of said electric motor by a second driver's operation, applied to the regeneration level selector, said regeneration level selector configured to select one of a plurality of levels;
an ECO switch that selects an ECO mode by a third driver's operation; and
an electronic control unit that inhibits said regeneration level selector from selecting a level less than a prescribed level when the ECO mode is applied.

8. The vehicle according to claim 7, wherein in a case where a level equal to or higher than the prescribed level is selected by said regeneration level selector, said electronic control unit sets said regenerative braking force for the same level to be identical at both of a time when the ECO mode is applied and a time when the ECO mode is not applied.

9. The vehicle according to claim 7, wherein, when said ECO mode is applied and when a speed of said vehicle is equal to or higher than a first prescribed value, said electronic control unit decreases said regenerative braking force as said speed increases.

10. The vehicle according to claim 7, wherein, when said ECO mode is applied and when a speed of said vehicle is equal to or less than a second prescribed value, said electronic control unit decreases said regenerative braking force as said speed decreases.

* * * * *